Patented Aug. 22, 1933

1,923,507

UNITED STATES PATENT OFFICE 1,923,507

METHOD OF PRODUCING RESIN ESTERS

Israel Rosenblum, Jackson Heights, N. Y.

No Drawing. Application May 6, 1930
Serial No. 450,313

11 Claims. (Cl. 260—98)

The present invention relates to a method of producing partial resin esters of polyhydric alcohols.

This application is a continuation-in-part of my application, Serial No. 336,632, filed January 31, 1929.

My invention has for its primary object to produce ester gums having free basic hydroxyls in considerable quantity and free of undesirable substances, particularly substances which precipitate from solution in ethyl acetate and other varnish and lacquer solvents and are of more or less crystalline character and therefore unable to produce continuous, adherent and homogeneous films. It is also an object of the invention to provide an improved method for producing partial esters of high molecular weight and of more or less resinous character which can combine with and neutralize acidic resins of various kinds, and particularly phenol-formaldehyde resins, to produce highly complex resins of extraordinarily high molecular weight which have a large range of solubility (i. e. can stand considerable dilution without precipitation) in the common varnish and lacquer solvents, have excellent film-forming properties, are compatible with nitrocellulose lacquers, and are in general capable of producing, with or without the aid of admixtures, varnishes and lacquers of superior quality.

It has heretofore been recognized that the acidic character of phenol-aldehyde (and particularly phenol-formaldehyde) resins limited considerably the field of application of varnishes or lacquers composed wholly or in part of such resins, and it has been proposed to neutralize such resins, which are usually produced in the presence of rosin, with glycerol (see United States patent to Amann and Fonrobert, No. 1,623,901). The rosin does not react to any appreciable extent with the phenol or the formaldehyde, or with the condensation product of these two compounds, such product being merely dissolved or dispersed in the rosin. Upon addition of glycerol to this mixture, there is formed the tri-rosinate (or tri-abietate) of the alcohol, such ester remaining in admixture with the phenol-formaldehyde condensate as a separate compound. No appreciable quantity of the mono and di-abietates is formed even if a considerable excess of glycerol is formed. The final product is thus a mixture of the phenolic resin and the ester gum, such product being characterized by an undesirably high viscosity, poor solubility in mineral spirits, and a low range of solubility, as precipitation occurs upon only moderate dilution of a solution thereof in mineral spirits.

I have also found that, when glycerol is added to rosin in the known manner indicated above, there are formed intermediate products of a ketonic or lactonic nature whose presence is highly objectionable because they are quite insoluble in the usual varnish and lacquer solvents (e. g. ethyl acetate), are crystalline rather than colloidal in character, and are incapable of forming a continuous film on drying. If it should be attempted to destroy these ketonic or lactonic bodies, which may comprise 5% to 10% of the reacting mass, by heating the latter, they form acids which attack any mono and di-rosinates which may be present and form therewith the tri-ester and thus prevent reaction between the partial esters and the phenolic resin.

In accordance with the present invention there are produced large quantities of the mono and di-esters with the complete, or substantially complete, absence of the undesirable ketonic or lactonic compounds.

In carrying out my invention, I heat a natural resin, and particularly rosin, preferably in the form of wood rosin or "stump" rosin, to a temperature of about 260° C. or above for a short time. The heating may occur for several hours and may take place in a retort or other suitable vessel, preferably out of contact with air.

The cracked or dry-distilled natural resin so produced has a much stronger tendency, I have found, to produce partial esters with a polyhydric alcohol, such as glycerol, mannitol, glycol, etc., than has the untreated resin. Upon the addition of an excess of, for example, glycerol (i. e. in excess of the theoretical quantity required to produce the tri-ester and to allow for unavoidable loss), at the cracking temperature or even below 250° C., the cracked resin, such as rosin, will produce up to about 30% to 40% of glycerol mono and di-abietates. These partial esters will be dissolved in the tri-abietate.

The dry-distilled resin, aside from being able to form larger quantities of partial esters than the untreated resin, has the further advantage that it has a lower acid number (120–130) than, for example, rosin (150–160), and is a better dispersing agent than the ordinary untreated rosin.

The mixture of mono and di-resinates produced as above described may then be caused to react with acidic synthetic resins, particularly acidic phenol-formaldehyde resins, to neutralize the same and produce a highly complex resin of very low acid number. I prefer to employ, as the phenol formaldehyde resin, the resinous condensates produced by reacting a phenol and an aldehyde in the presence of an organic salt of a metal selected from the group consisting of the alkali metals, the second group of the periodic system, lead, cobalt, and manganese as described in the said application Serial No. 336,632. As therein described, such organic salt may be an abietate, tungate, oleate, stearate, acetate., etc., the zinc salts being preferred.

I claim:

1. The method of producing the partial esters of a polyhydric alcohol with resin acids, which comprises dry-distilling a natural resin at a temperature of about 260° C. or above, and heating the resulting mass with an excess of a polyhydric alcohol sufficient to produce partial esters with said resin.

2. The method of producing the partial esters of a polyhydric alcohol with resin acids, which comprises dry-distilling a natural resin at a temperature of about 260° C. or above, and heating the resulting mass with an excess of glycerol sufficient to produce partial esters with said resin.

3. The method of producing the partial esters of a polyhydric alcohol with resin acids, which comprises dry-distilling wood rosin at a temperature of about 260° C. or above, and heating the resulting mass with an excess of a polyhydric alcohol sufficient to produce partial esters with said resin.

4. The method of producing the partial esters of a polyhydric alcohol with resin acids, which comprises dry-distilling wood rosin at a temperature of about 260° C. or above, and heating the resulting mass with an excess of glycerol sufficient to produce partial esters with said resin.

5. The method of producing the partial esters of a polyhydric alcohol with resin acids, which comprises dry-distilling rosin at a temperature of about 260° C. or above, and heating the resulting mass with an excess of a polyhydric alcohol sufficient to produce partial esters with said resin.

6. The method of producing the partial esters of a polyhydric alcohol with resin acids, which comprises dry-distilling rosin at a temperature of about 260° C. or above, and heating the resulting mass with an excess of glycerol sufficient to produce partial esters with said resin.

7. A mixture of the natural resin esters of a polyhydric alcohol containing substantial quantities of the partial esters.

8. A mixture of the natural resin esters of glycerol containing substantial quantities of the partial esters.

9. A mixture of glyceridic resinates containing substantial quantities of the mono and di-resinates.

10. A mixture of glyceridic rosinates containing substantial quantities of mono and di-abietates.

11. The method of producing the partial esters of a polyhydric alcohol with natural resin acids, which comprises dry-distilling rosin at a temperature of about 260° C. or above, and heating the resulting mass with an excess of glycerol until a product which is clear in the cold and contains substantial quantities of the partial esters of glycerol is obtained.

ISRAEL ROSENBLUM.